United States Patent [19]

Haves

[11] 4,262,830
[45] Apr. 21, 1981

[54] LATCH MECHANISM

[75] Inventor: Raymond H. Haves, Detroit, Mich.

[73] Assignee: Wisco Corporation, Ferndale, Mich.

[21] Appl. No.: 52,125

[22] Filed: Jun. 25, 1979

[51] Int. Cl.³ .......................... B60R 19/02; E05C 3/06
[52] U.S. Cl. ................................ 224/42.06; 292/201; 224/42.21
[58] Field of Search ............... 224/42.06, 42.12, 42.21, 224/42.28; 414/463, 465, 466; 296/37.2, 37.3, 37.5, 57 R; 292/201, 216

[56] References Cited

U.S. PATENT DOCUMENTS

| Re. 27,390 | 6/1972 | Allen | 292/201 |
|---|---|---|---|
| 2,325,225 | 7/1943 | Burke | 292/201 X |
| 2,711,273 | 6/1955 | Stromberg | 224/42.06 |
| 2,755,948 | 7/1956 | Winkle | 414/466 |
| 2,805,807 | 9/1957 | Slack | 224/42.21 |
| 3,917,330 | 11/1975 | Quantz | 292/201 X |

Primary Examiner—Steven M. Pollard
Attorney, Agent, or Firm—Basile, Weintraub & Hanlon

[57] ABSTRACT

A latch mechanism for releasably locking a hinged ornamental spare tire cover for vehicles into position is disclosed. The device comprises: a base member mounted to a rear bumper of the vehicle; a tire cover hinged to the base; the cover movable from a first position adjacent a trunk lid of the vehicle to a second position hinged away from the trunk lid providing access to a trunk lock and fuel filler connection. A latch mechanism is provided to lock and hold the cover in the first position and release the cover for movement to the second position. The latch release is selectively operated by a manually pivotable lever means, a key rotatable lock means, or an electrically activated solenoid.

5 Claims, 3 Drawing Figures

LATCH MECHANISM

BACKGROUND OF THE INVENTION

I. Field of the Invention

The present invention relates generally to the field of locking devices, and more particularly to the field of automotive locking devices including a remotely operable electric release. Even more particularly the present invention relates to the field of automotive locking devices with a remotely operable electric release and a manually operated release therefore.

II. Description of the Art

Remote electrically operated release mechanisms for locking devices employed in automobiles are known. Generally, the known devices include a key rotatable lock means for operating the latch release from outside the vehicle. In certain installations it is desirable to provide a latch release mechanism which is operable without a key to release the lock. Ornamental tire covers which are hinged to a rear bumper of the vehicle are typical of installations requiring a convenient mechanical release for hinging the tire cover away from the trunk lid to provide access to the trunk lid lock and/or the fuel tank filler connection when it is located near the center of the rear bumper. Presently used mechanical release devices employ a cable or chain which is fed through a tube leading to the interior of the latch release. Pulling on the cable or chain mechanically releases the latch mechanism. An accumulation of mud or ice can often disable this type of mechanical release mechanism, and if the vehicle has a broken electrical connection or a dead battery it is impossible to release the tire cover to fuel the vehicle or to open the trunk lid. It is to this problem that the present invention is directed. U.S. Pat. Nos. 3,917,330 and Re. 27390 disclose a locking mechanism for releasably securing a deck lid of an automobile vehicle which includes an electric lock release for operating the mechanism from a remote location. A key operated cylinder mechanism is also provided for releasing the latch in a conventional manner. These patents constitute the most relevant art known to the Applicant and his Attorney.

SUMMARY OF THE INVENTION

The present invention comprises a device for releasably locking a hinged ornamental spare tire cover for vehicles in position. The device of the present invention comprises a base member mounted to a rear bumper of the vehicle; a tire cover hinged to the base, the cover movable from a first position adjacent a trunk lid of the vehicle to a second position hinged away from the trunk lid to provide access to a trunk lock and/or fuel filler connection. A latch mechanism is provided to lock and hold the cover in the first position and selectively release the cover to the second position. The latch release is selectively operated by either a manually operated lever means, a key rotatable lock means, or an electrically activated solenoid means. The latch mechanism of the present invention comprises: a housing including a perimeter wall surrounding a perimeter thereof; a latch pivotally supported by the housing and movable between a first position retaining the spare tire cover in an upright position to a second position releasing the tire to be hinged away from the trunk lid; a biasing means for urging the latch member to the second position; a latch cam pivotally supported by the housing and operable to hold the latch member in the first position; with the latch cam biased to hold the latch member in the first position. The latch mechanism includes an electrically operated solenoid to pivot the latch cam to the second position releasing the latch member to the second position and thereby releasing the tire cover to be hinged away from the trunk lid.

The latch mechanism also includes a manually pivotable lever means for operating the latch release. The manually pivotable lever means comprises an aperture formed in the perimeter wall proximate an armature of the solenoid; a longitudinal slot formed in an outward extension of the solenoid armature; a rod slidingly engaging the aperture formed in the perimeter wall and the longitudinal slot; a circular groove formed around the perimeter of the rod between the perimeter wall and the armature; and a retaining ring engaging the groove to limit longitudinal movement of the rod. The rod pivoting about the perimeter wall defines a lever to urge the solenoid armature inward pivoting the latch cam in the second direction thereby releasing the latch means to the second position which pivots the tire cover to the second position allowing the trunk lid to be raised and/or the fuel filler cap to be reached.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein.

DESCRIPTION OF THE PREFERRED EMBODIMENT

Figure 1:
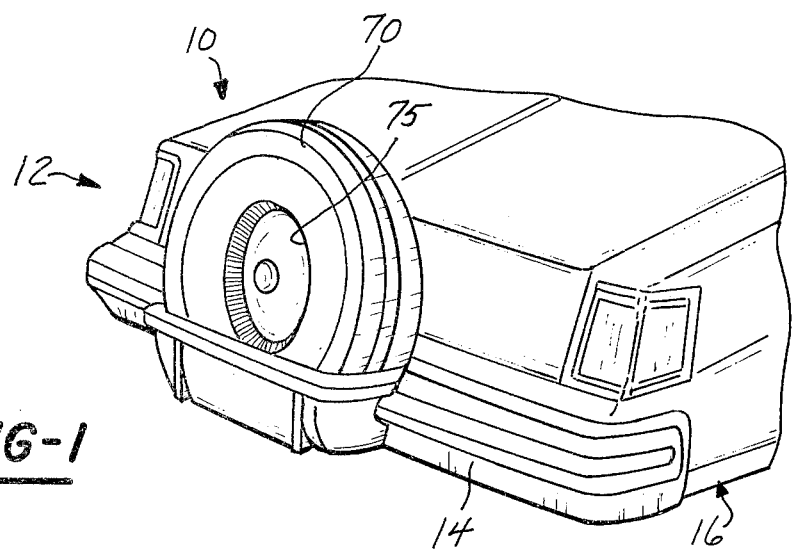
FIG. 1 illustrates a broken perspective view of a vehicle employing the ornamental tire cover and latch mechanism of the present invention.

Referring now to the drawings and in particular to FIG. 1 wherein there is illustrated at 10 a preferred embodiment of the present invention comprising an ornamental tire cover 12 hinged to the rear bumper 14 of a vehicle 16.

The tire cover 12 is movable from a first position adjacent a trunk lid of the vehicle to a second position hinged away from the trunk lid to provide access to a trunk lock and in some vehicles a fuel filler connection. Normally when the operator of the vehicle wishes to open the trunk lid, a switch is activated within the vehicle which electrically unlocks the trunk lid and a latch mechanism 18 (FIG. 2) which allows the tire cover 12 to move to the second position clearing the trunk lid and allowing the trunk lid to open. If the vehicle operator wishes to unlock and raise the trunk lid from outside the vehicle, a manually pivotable lever means 20 is provided to release the tire cover 12 to the second position allowing access to the trunk lock wherein the trunk lid can be opened with a key. If the vehicle has a fuel filler connection at the center of the rear bumper, it is necessary to first pivot the tire cover assembly 12 to the second position to expose the fuel filler. A gas station attendant can move the tire cover 12 to the second position employing the manually pivotable lever means 20 without assistance from the vehicle operator. The latch mechanism 18 is configured to automatically latch the tire cover 12 in the first position when the tire cover has been returned to the first position manually.

Figure 2:
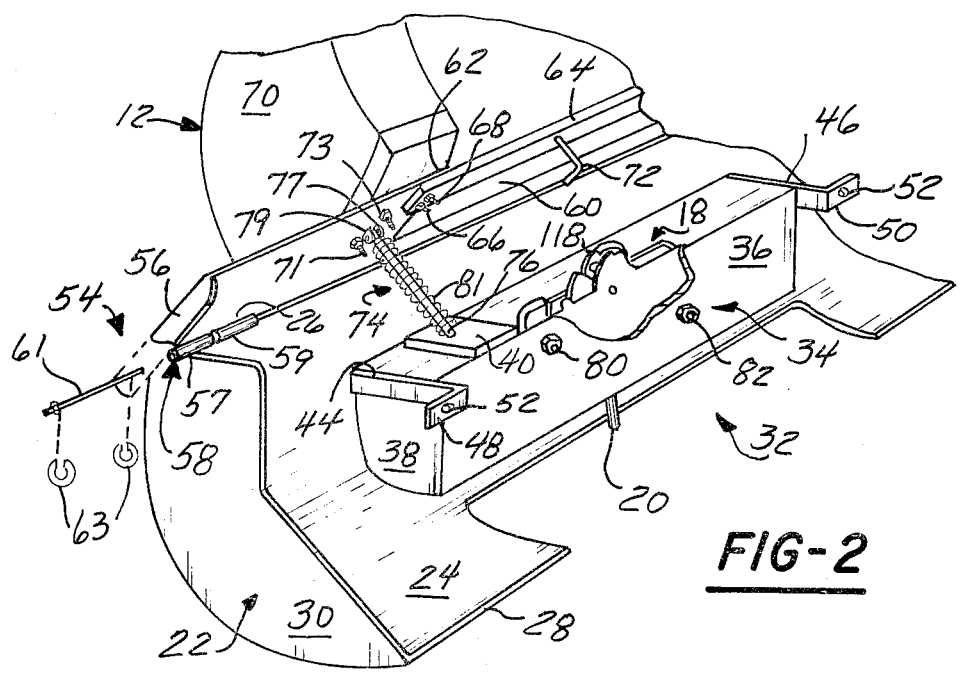
FIG. 2 illustrates a broken perspective view of the latch mechanism and hinged tire cover of the present invention hinged to the second position.
Figure 3:
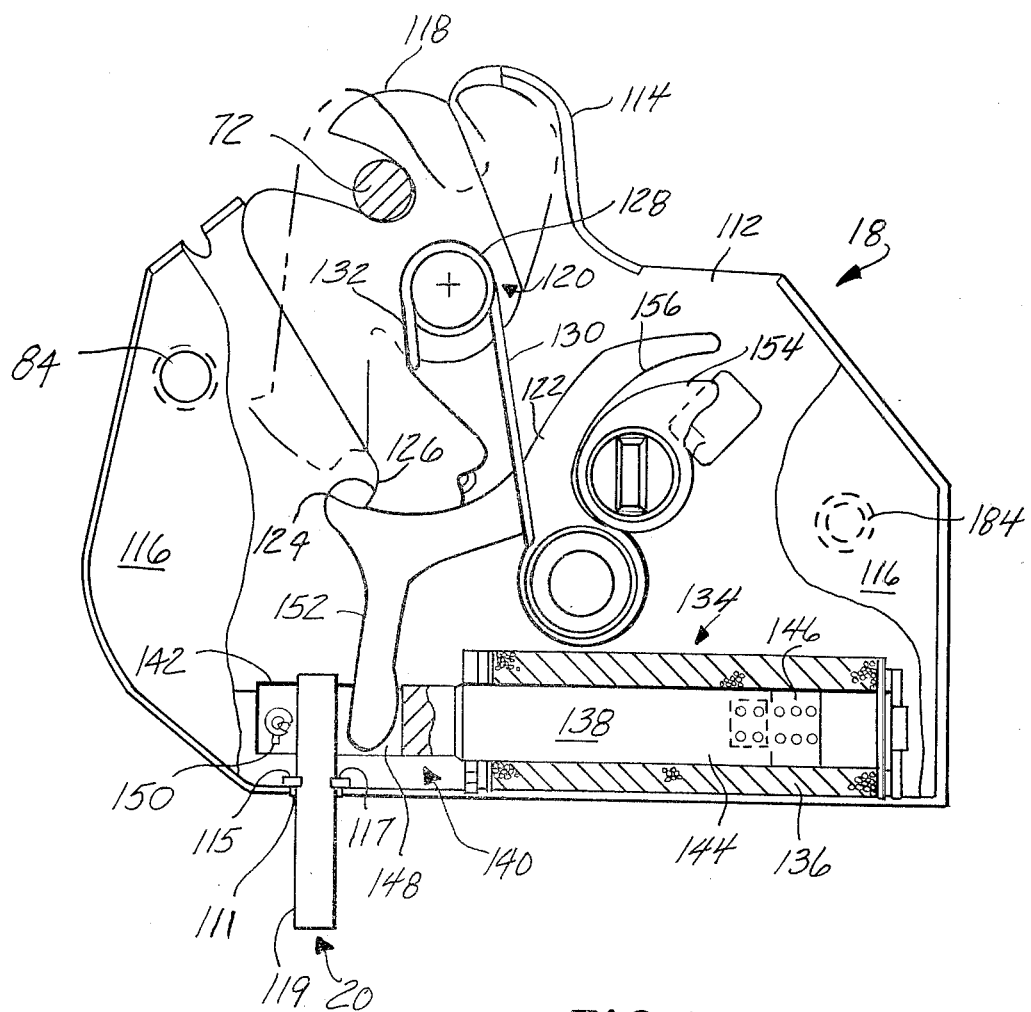
FIG. 3 illustrates a cross-sectional view of the latch mechanism of the present invention.

Referring again to the drawings and in particular to FIGS. 1 thru 3 wherein there is illustrated at 10 a preferred embodiment of the ornamental tire cover assembly 12 which employs the latch mechanism 18. The ornamental tire cover assembly 12 comprises a base member 22 including an outer wall 24 with a top edge 26 spaced outward from the bumper. The outer wall 24 extends downward and inward in an arcuate manner to meet a lower edge of the bumper. A forward edge 28 integral with the outer wall extends forward a distance to abut a lower portion of the bumper. A pair of opposed side walls 30 integral with the outer wall 24 extend from the outer wall to the bumper enclosing the sides of the support member and forming an open top. An access opening 32 is formed centrally in a lower portion of the outer wall extending from the bumper rearward a distance. The access opening 32 provides room for a person to extend his hand upward and operate the manually pivotable lever means 20.

A support bracket 34 includes a transverse vertical wall 36 spaced between the outer wall 24 and the bumper. A pair of opposed vertical side walls 38 integral with the vertical wall 36 extend rearward to the outer wall 24 and are affixed thereto by welding or other suitable means to position the support bracket 34. A horizontal wall 40, integral with the outer portions of an upper edge of the vertical wall extends rearward a distance.

A pair of spaced apart mounting brackets 44,46 are affixed to the side walls 38 and extend horizontally forward a distance therefrom. A forward portion 48,50 of the mounting brackets 44,46, respectively, is bent horizontally outward to abut the bumper, and a pair of apertures 52 formed in the forward portions are aligned with a pair of apertures in the bumper. A pair of bolts passing through the forward portion apertures 52 and the bumper apertures threadingly engage a pair of nuts to secure the support member to the bumper.

A hinged member 54 overlays the open top with downward extending flanges 56 along a side and rear edges thereof to stiffen the hinged member and add to the appearance of the assembly. A pair of opposed hinges 58 are spaced forward from the rear edge of the hinged member to hinge the hinged member 54 to the top edge 26 of the outer wall. The hinges 58 comprise a first pair of hinge tubes 57 affixed to the flange 56 and a second pair of hinge tubes 59 affixed proximate the top wall 26 and aligned with the first tubes. A pair of hinge pins 61 slidingly engage the tubes 57,59 forming a hinge. A pair of grooves 63 formed at each end of the hinge pins 61 snugly receive a pair of retaining rings 65 to secure the pins in position. A central opening 60 extends rearward a distance from a forward edge 62 of the hinged member 54. A lock bolt support bar 64 extends across the central opening at the forward edge 62, and one or more apertures 66 at the ends of the lock bolt support bar 64 are aligned with one or more apertures (not shown) in the hinged member. A plurality of bolts 68 engage the plurality of apertures in the lock bolt support bar 64 and the hinged member 54 and a plurality of nuts threadingly engage the bolts to secure the lock bolt support bar 64 to the hinged member 54.

An "L" shaped lock bolt 72 having a threaded end engages a threaded aperture formed centrally in the lock bolt support bar 64. The threaded end of the "L" shaped lock bolt 72 threadingly engages the threaded apertures in the lock bolt support bar 64 and a nut threadingly engages the threaded end to secure the lock bolt 72 to the clock bolt support bar 64 with a lower leg of the "L" facing rearward.

A hinged stop means 74 comprises a hinged stop rod 76 having an upper end hinged to a clevis 77 fixedly attached to the hinged member 54. An opening formed in an upper portion of the hinged stop rod 76 slidingly engages a rod 79 which is pressed into the clevis opening to form a hinge. A lower portion of the hinged stop rod 76 slidingly engages an opening, not shown, formed in the horizontal wall 40 of the support bracket 34. A lower end of the rod 76 is bent at a right angle after passing through the opening to prevent removal of the rod 76 from the opening and to form a stop limiting the amount the hinged member 54 can be hinged from the support member 34, thus defining a second position for the cover. A spring 81 interposes the clevis and the wall 40 to bias the cover to the second position.

A tire cover 70 comprises a short hollow cylinder with rounded edges formed in the shape of an upright disc. A segment of a lower portion of the disc is removed forming a flat surface abutting the hinged member. A pair of opposed flanges (not shown) extend horizontally inward from an outer edge of the flat surface, and one or more apertures formed in the flanges are alinged with one or more apertures in the hinged member 54 to receive one or more bolts 71. A plurality of nuts 73 engage the bolts 71 to secure the tire cover 70 to the hinged member 54. A circular recess formed at a center of the rear surface of the tire cover 70 provides a space to receive a hub cap 75 (FIG. 1). The disc is open at a forward edge thereof, with a portion of the forward edge extending radially inward a distance to enclose the tire cover 70 when in the first position.

The latch mechanism 18 is bolted to the transverse vertical wall 36 by the pair of bolts 80,82 which pass through a pair of apertures (not shown) in the vertical wall 36 aligned with the pair of threaded apertures 84 in a cover 116 of the latch mechanism 18, as shown in FIG. 3. The latch mechanism 18 is positioned so that a latch member 118 can engage the lock bolt 72 and lock the ornamental tire cover assembly 12 in the first position.

Referring again to the drawings and in particular to FIG. 3 wherein there is illustrated a partial cross-sectional view of the latch mechanism 18. The latch mechanism 18 comprises a housing 112 with a perimeter wall 114 around the perimeter thereof. A cover 116 encloses the housing 112 and provides a support for the various elements contained within the housing 112. The latch member 118 is pivotally supported by the housing 112 and is movable between a first position retaining the lock bolt 72 and the ornamental tire cover assembly 12 in the first position and a second position releasing the lock bolt 72 and allowing the ornamental tire cover assembly 12 to move to the second position.

A biasing means 120 urges the latch member 118 to the second position (FIG. 3). A portion of the latch member 118 abuts a portion of the perimeter wall 114 when the latch member 118 is in the second position. A latch cam 122 is pivotally supported by the housing and is operable to hold the latch member 118 in the first position. A vertical projection 124 of the latch cam 122 engages a vertical wall 126 of the latch member 118 to hold the latch member 118 in the first position. The biasing means 120 biases the latch cam to hold the latch member in the first position. The biasing means 120 comprises a torsion spring 128 wrapped around a pivot of the latch member 118 with a pair of arms 130 and 132 extending outward therefrom. An arm 130 urges the latch cam 122 in a direction to hold the latch member in the first position. An arm 132 urges the latch cam in the first position. A solenoid 134 comprises an electrically activated means for operating and releasing the latch member 118 from engagement with the lock bolt 72. The solenoid 134 comprises a coil 136 and an armature 138 longitudinally movable within the coil. The armature includes an outer end 140, an outward extension 142 and an inner end 144. The armature is movable between a first position wherein the armature is extended outward and a second position wherein the armature is moved inward. The armature is biased outward by a biasing spring 146 which abuts the inner end 144.

A longitudinal slot 148 is formed along the outward extension 142 of the armature 138 extending across the extension and along the outward extension a distance. An aperture through the outward extension near the end thereof frictionally receives a spring pin 150 which extends across the slot. The purpose of the pin will be discussed subsequently. A latch cam arm 152 integral with the latch cam 122 slidingly engages the longitudinal slot, and when the solenoid 132 is energized the armature 138 is pulled into the coil 136 by magnetic force which overcomes the biasing spring 146. A rod 119, which is described more fully below, is interposed between the spring pin 150 and the latch cam arm 152. The inward movement of the armature 134 causes the spring pin 150 to engage the rod 119 which engages the latch cam arm 152 to disengage the latch cam from the latch member 118 allowing the biasing means 120 to move the latch cam 118 to the second position which releases the lock bolt 72 allowing the tire cover assembly 12 to move to the second position.

The manually pivotable lever means for releasing the tire cover to the second position comprises: an aperture 111 formed in the perimeter wall proximate the longitudinal slot (FIG. 3). The rod 119 slidingly engages the aperture 111 and the slot between the spring pin 150 and the latch cam arm 152, the rod 119 extending outward from the housing a distance to define a pivotable lever means 20. A circular groove 115 formed on the rod perimeter between the perimeter wall and the slot, receives a retaining ring 117 which engages the groove to limit the longitudinal movement of the rod 119. When the lever means 20 is pivoted to urge the armature 138 to the second position an inward end of the lever moves the latch cam arm 152 against the latch cam biasing means 120 releasing the latch member to the second position.

A key rotatable cam 154 (FIG. 3) is pivotally mounted to the housing 112. A cam surface 156 of the latch cam 122 engages the key rotatable cam 154 and rotation of the key cam 154 urges the latch cam 122 against the biasing means 120 to release the latch member 118 for rotation to the second position.

There has been described hereinabove a device for releasably locking a hinged ornamental spare tire cover for vehicles in a first position adjacent the trunk lid of the vehicle and releasing the tire cover to a second position hinged away from the trunk lid to provide access to the trunk lock and fuel filler of the vehicle. The latch is releasable by a manually pivotable lever means, a key rotatable lock means or an electrically activated solenoid means.

Having thus described the invention, what is claimed is:

1. The combination with a motor vehicle having a decorative tire cover mounted to a rear bumper comprising:

a base member including an outer wall with a top edge spaced outward from the bumper, the outer wall extending downward and inward in an arcuate manner to meet a lower edge of the bumper, a forward edge integral with the outer wall extending forward a distance abutting a lower portion of the bumper, a pair of opposed side walls extending from the outer wall to the bumper enclosing the sides of the support member and forming an open top, an access opening formed centrally in a lower portion of the outer wall extending from the bumper rearward a distance;

a support bracket including a transverse vertical wall spaced between the base member and the bumper, a pair of opposed vertical side walls extending from the vertical wall to the outer wall and affixed thereto by welding or other suitable means, a horizontal wall integral with the outer portions of an upper edge of the vertical wall extending rearward a distance;

a pair of spaced apart mounting brackets affixed to the side walls having a forward portion bent horizontally outward and abutting the bumper, a pair of apertures formed in the forward portions aligned with a pair of apertures in the bumper, a pair of bolts passing through the forward portion apertures and the bumper apertures, and a pair of nuts threadingly engaging the bolts to secure the support member to the bumper;

a hinged member overlaying the open top with downward extending flanges along a side and rear edges thereof, a pair of opposed hinges spaced forward from the rear edge to hinge the hinged member to the top edge of the outer wall, a central opening extending rearward a distance from a forward edge of the hinged member;

a tire cover in the form of a short hollow cylinder with rounded edges to form an upright disc, a segment of a lower portion of the disc removed to form a flat surface abutting the hinged member, a pair of flanges extending horizontally inward from an outer edge of the flat surface, one or more apertures formed in the flanges to align with one or more apertures in the hinged member and one or more bolts passing through the apertures in the flanges and the hinged member and a plurality of nuts threadingly engaging the bolts to secure the tire cover to the hinged member;

a lock bolt support bar extending across the central opening at a forward edge thereof, one or more apertures at the ends of the bolt support bar aligned with one or more apertures in the hinged member, a plurality of bolts passing through the aligned apertures in the bolt support bar and the hinged member, and a plurality of nuts threadingly engaging the bolts to secure the bolt support bar to the hinged member;

an "L" shaped lock bolt having a threaded end engaging a threaded aperture formed centrally in the bolt support bar, the threaded end engaging the threaded aperture and a nut threadingly engaging the threaded end to secure the lock bolt to the bolt support bar;

a hinge stop means comprising a rod having an upper end hinged to a clevis affixed to the hinged member and a lower portion slidingly engaging an opening formed in the horizontal wall of the support bracket, a lower end of the rod bent at a right angle to prevent removal of the rod from the aperture to form a stop limiting the amount the hinge member can be hinged from the support member defining a second position for the tire cover;

a spring interposed the clevis and the horizontal wall biasing the tire cover to the second position; and a latch mechanism to releasably lock and hold the tire cover in a first position adjacent a trunk lid of the vehicle wherein the lock bolt is retained by a latch member, and to release the lock bolt releasing the tire cover to the second position wherein the cover is hinged away from the trunk allowing access to the trunk lock and a fuel filler connection, the latch member releasing the lock bolt by an electrically actuated means or a manually pivotable lever means.

2. The combination of claim 1 wherein the latch mechanism comprises:

a housing with a perimeter wall around a perimeter thereof;

a latch member pivotally supported by the housing and movable between a first position retaining the lock bolt and the spare tire cover in the first position and a second position releasing the lock bolt allowing the spare tire cover to move to the second position;

a biasing means urging the latch member to the second position;

a latch cam pivotally supported by the housing and operable to engage and hold the latch member in the first position; and the latch cam biased to hold the latch member in the first position.

3. The combination of claim 2 wherein the electrically activated means for operating the latch release comprises:

a solenoid including a coil;

an armature longitudinally movable within the coil;

the armature including an outer end and an inner end;

the armature movable between a first position wherein the armature is extended outward and a second position wherein the armature is moved inward;

an armature biasing means urging the armature to the first position;

a portion of the armature extending outward from the coil defining an armature outward extension;

a longitudinal slot formed along the outward extension of the armature extending across the outward extensions along the outward extension a distance, an aperture through the outward extension near the outer end extending across the longitudinal slot;

a spring pin frictionally engaging the aperture extending across the slot;

a latch cam arm integral with the latch cam slidingly engaging the longitudinal slot; and whereby energizing the coil moves the armature inward against the solenoid biasing means, the spring pin engages the latch cam arm to move the latch cam out of engagement with the latch member allowing the biasing means to move the latch member to the second position.

4. The combination of claim 3 wherein the manually pivotable lever means for releasing the tire cover to the second position comprises:

an aperture formed in the perimeter wall proximate the longitudinal slot;

a rod slidingly engaging the aperture and the slot between the spring pin and latch cam arm, the rod extending outward from the wall a distance to define a pivotable lever, a circular groove formed on the rod perimeter between the perimeter wall and the slot, a retaining ring engaging the groove to limit longitudinal movement of the rod; and whereby pivoting the lever to urge the armature to the second position moves the latch cam arm against the latch cam bias means releasing the latch member to the second position.

5. A latch release mechanism of the type including a housing therefore a solenoid to release a lock bolt, and a key rotatable means to release the lock bolt, the improvement comprising a manually pivotable lever means pivotally supported by the housing, the lever mechanically urging the solenoid to the release position.

* * * * *

UNITED STATES PATENT AND TRADEMARK OFFICE
CERTIFICATE OF CORRECTION

PATENT NO. : 4,262,830

DATED : April 21, 1981

INVENTOR(S) : Raymond H. Haves

It is certified that error appears in the above—identified patent and that said Letters Patent is hereby corrected as shown below:

In the drawings delete Figure 2 and substitute the attached Figure therefore.

UNITED STATES PATENT AND TRADEMARK OFFICE
CERTIFICATE OF CORRECTION

PATENT NO. : 4,262,830

Page 2 of 2

DATED : April 21, 1981

INVENTOR(S) : Raymond H. Haves

It is certified that error appears in the above—identified patent and that said Letters Patent is hereby corrected as shown below:

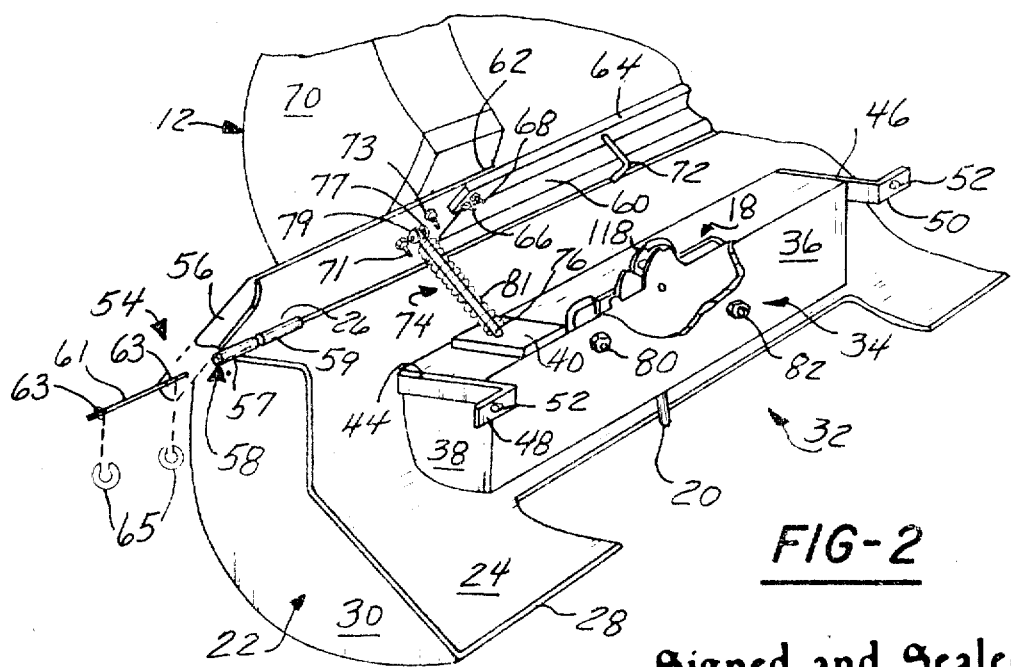

FIG-2

Signed and Sealed this

Third Day of November 1981

[SEAL]

Attest:

GERALD J. MOSSINGHOFF

Attesting Officer     Commissioner of Patents and Trademarks